United States Patent [19]
Kendall

[11] Patent Number: 5,730,226
[45] Date of Patent: Mar. 24, 1998

[54] DIVOT REPAIR DEVICE

[76] Inventor: George Kendall, P.O. Box 9132, Rancho Santa Fe, Calif. 92067

[21] Appl. No.: 585,046

[22] Filed: Jan. 11, 1996

[51] Int. Cl.⁶ .................................................. A01B 1/00
[52] U.S. Cl. ......................... 172/378; 172/371; 473/408
[58] Field of Search ................................. 172/371–381; 294/50.7, 50.8; 473/408, 286, 406; 111/101, 106, 100

[56] References Cited

U.S. PATENT DOCUMENTS

| | | |
|---|---|---|
| 3,168,150 | 2/1965 | Kappler . |
| 3,171,499 | 3/1965 | Edwards ................................. 172/371 |
| 3,425,732 | 2/1969 | Reich ................................. 294/50.8 X |
| 3,539,017 | 11/1970 | Johnson ................................. 172/378 |
| 3,567,264 | 3/1971 | Baber . |
| 4,179,147 | 12/1979 | Mendenhall . |
| 4,884,805 | 12/1989 | Patterson ................................. 172/378 X |
| 5,154,465 | 10/1992 | Pakosh ................................. 294/50.8 |
| 5,301,565 | 4/1994 | Weismann et al. . |
| 5,322,130 | 6/1994 | Ryden ................................. 172/378 |
| 5,357,894 | 10/1994 | Jacobson . |
| 5,452,767 | 9/1995 | Smotherman ................................. 172/378 X |
| 5,469,923 | 11/1995 | Visser ................................. 172/378 X |
| 5,511,785 | 4/1996 | Rusin, Jr. ................................. 172/378 X |

*Primary Examiner*—Terry Lee Melius
*Assistant Examiner*—Victor Batson
*Attorney, Agent, or Firm*—Lyon & Lyon LLP

[57] ABSTRACT

While playing golf, it is common to land a ball on the green and leave a divot or indentation. It is proper golf etiquette to repair this divot so as not to affect the game of a subsequent golfer. But, many golfers do not repair their own divots, either because they are not aware they should, or because repair takes too much effort. For those that do attempt to repair their own divots, they often do it incorrectly and damage the fragile green turf even more. Either way, the golf course keeper must expend considerable resource in repairing unfixed or incorrectly fixed divots. The device disclosed herein allows a golfer or grounds keeper to easily, quickly, and correctly repair green divots while standing. The user simply centers the device over a divot and presses down on the engagement knob. As the device is engaged, blades are angled into the turf under the divot, and then tilted inwardly to fill in the indentation. This action, which simulates the proper hand-repair method, correctly repairs the divot and leaves the green in proper playing condition.

20 Claims, 7 Drawing Sheets

DIVOT REPAIR DEVICE

FIELD OF THE INVENTION

The invention described herein relates generally to mechanical tools for automatically repairing golf course turf, and in particular for repairing ball marks, indentations, or divots caused when golf balls impact golf course greens at a high trajectory and high rate of speed.

BACKGROUND OF THE INVENTION

In the game of golf, it is common for the golf ball to land on the putting surface called the "green" with sufficient force to leave a ball mark indentation, or divot. It is proper golf etiquette for players to repair the indentation their balls made on the green surface, but many either fail to do so or compound the problem by doing it improperly. Therefore, it is necessary for the greens-keepers and their staff to professionally repair every green at regular intervals and virtually every day because one of the most frustrating experiences in the game of golf is to have a putt diverted off line by a divot or ball mark which has either been unrepaired or improperly repaired. As a further complication, if the ball marks are neglected for more than 24 hours or repaired improperly, as shown for example in FIG. 19a, the damaged grass will die, leaving an unsightly brown spot about the size of a half dollar coin.

The dead grass brown spot problem is then shifted to the golf course superintendent whose job it is to see that the entire golf course, the greens in particular, is maintained in good condition to satisfy the golfers. He or she must allocate many hours early in the morning before each day's play to the repair of yesterday's marks. Additional resources must be devoted to repair or replace brown spots remaining from overlooked or improperly repaired marks from previous days. So teams of ground keepers must spend many hours to repair the 18 greens which comprise a golf course. This is a slow, tedious, expensive, but necessary task, which if left undone may cause even further expense for turf reseeding or replacement. Worst of all, poorly maintained greens can result in ruining the reputation of a golf course and its management.

Figure 19A:
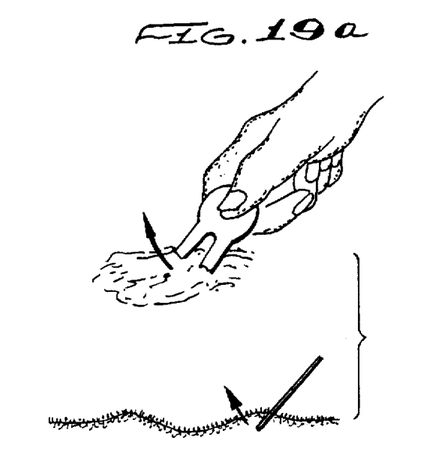
FIGS. 19a and 19b are a reproduction from a card typically handed out at golf courses illustrating the conventional technique for repairing divots, with FIG. 19a showing the wrong way to repair a divot and FIG. 19b showing the right way to repair a divot.
Figure 19B:
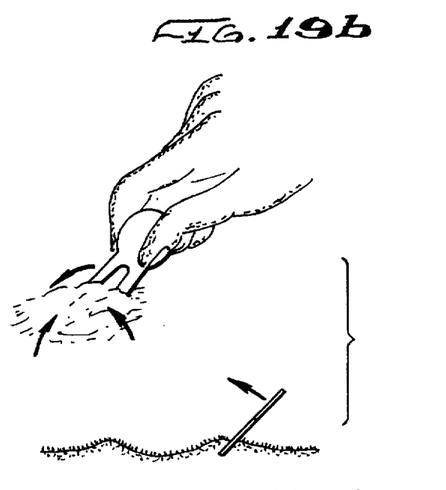
Figure 19C:
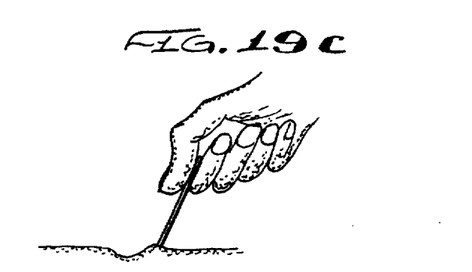
Figure 19D:
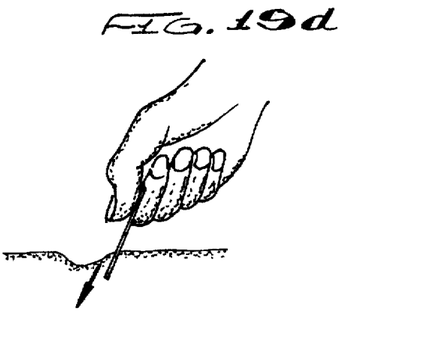
Figure 19E:
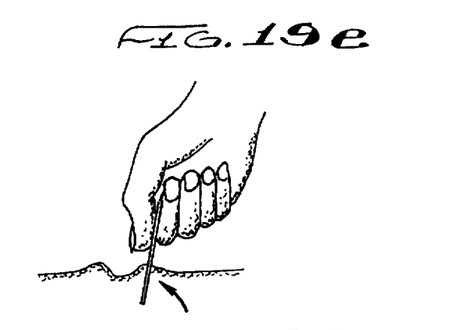
Figure 19F:
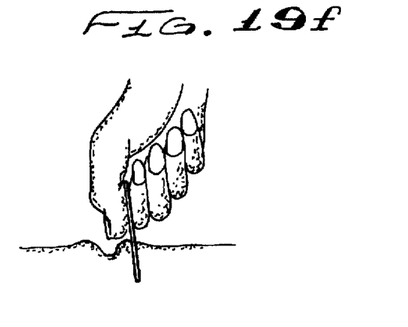
Figures 20A, 20B:
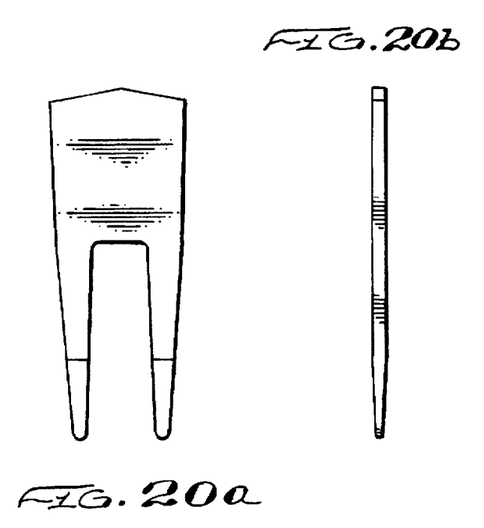
Figure 21:
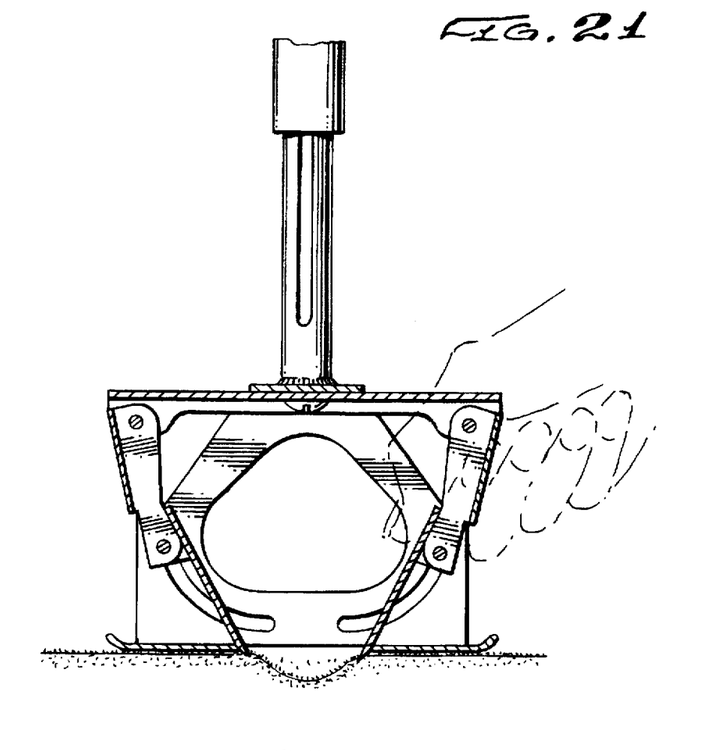
FIGS. 21–24 diagram the preferred embodiment in various phases of engagement, showing the progression of the blade into the turf and its rotation and translation, and compares this motion to the path a human hand takes when correctly repairing a divot using a hand-held tool.
Figure 22:
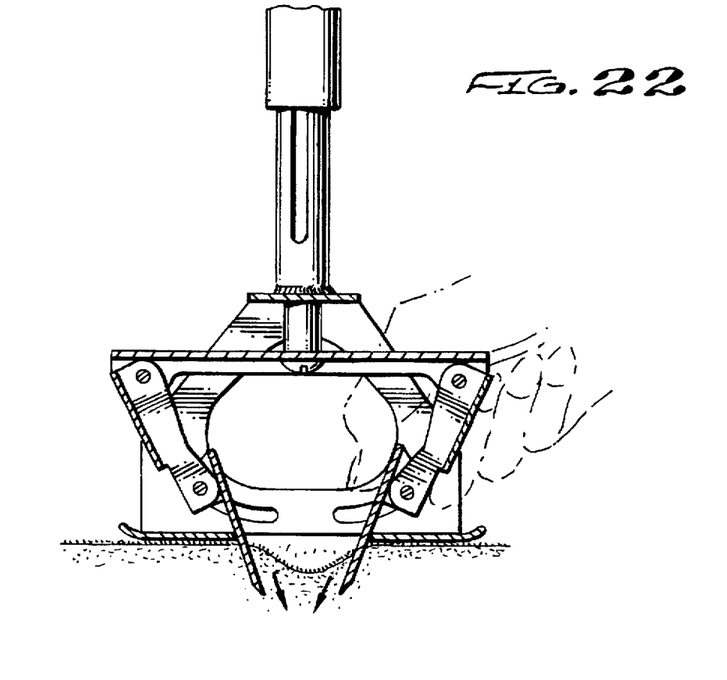
Figure 23:
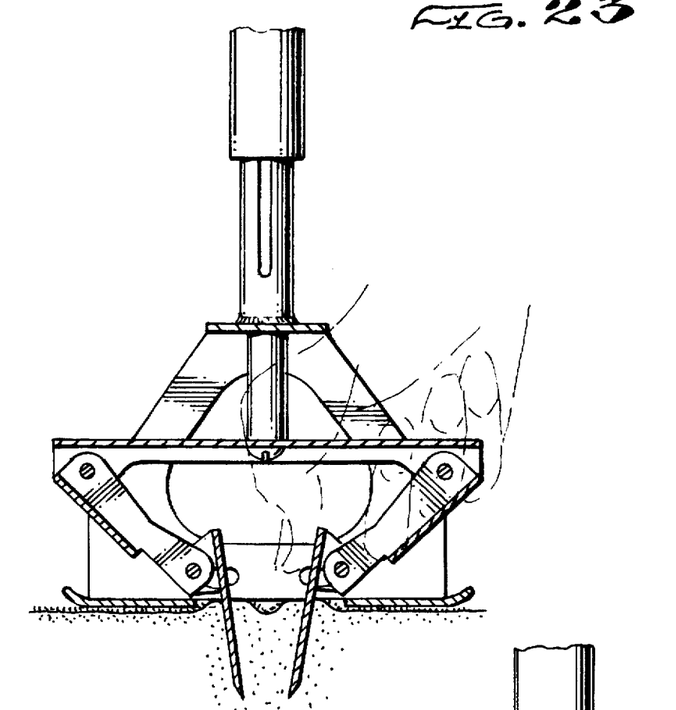

Conventional thinking at present is that the most effective way for repairing ballmarks is by hand, by using a primitive hand-operated, sometimes pronged, device or lever. A typical hand tool used for this purpose is shown in FIGS. 20a and 20b. The use of this device is best shown in FIGS. 19b and 19b, which is a drawing from a card handed to golfers or placed in golf carts by many golf course superintendents to educate golfers as to how to properly repair a ball mark. These figures am very informative because it shows the education process is still ongoing, and that a significant number of even the most conscientious golfers still repair ball marks incorrectly. As indicated in FIG. 19b, for proper use, the prongs of the hand-tool or lever should be inserted into the ground adjacent to the ball-mark at an angle so that the tips are directed toward the center and beneath the ball mark indentation. After the hand tool is inserted, it should be tilted inwardly, rotating about the tips, to displace the compressed turf toward the center of the indentation, thus filling the ball mark or indention. There must be no upward force as shown in FIG. 19b. This process must be repeated several times around the periphery of the indentation to fill the mark and restore the spot to its original condition. FIGS. 19c, 19d, 19e, and 19f show in sequence the proper motion for each insertion of the divot repair tool.

There are at least four major problems with this procedure. First, the hand-tool requires much bending over, stooping and/or squatting which may be tiring, awkward and even physically difficult or impossible for many golfers, who, in some instances are elderly. Second, the hand tool must be skillfully inserted several times around the perimeter of the ball mark which, to be done effectively, requires considerable dexterity and effort. Third, using the hand tool effectively and properly requires patience and time, which may cause play to be delayed or reduce the enjoyment of the game. Fourth, and most important, the hand tool is often misused, aggravating the problem and leading to the killing of the grass in the area attempted to be repaired. For example, the grass can die if the hand tool is inserted and the tip pried upward. From an external appearance the area may look repaired as the turf is level, but in reality the grass roots are often damaged or displaced from the soil and die, forcing the area to be resodded or reseeded—a very costly and time-consuming process.

The need is evident for an easy to operate, reliable, and durable device that can be used from a standing position to correctly repair divots. To the inventor's knowledge, prior mechanical devices of record to automate the above cumbersome manual procedure have not worked effectively. For example, they have not overcome the problems that they are too complicated and cumbersome, often requiring two hands to operate. Additionally, the prior art devices of record do not perform the assigned function satisfactorily, or they create upward forces as contraindicated by the recommended procedure in FIG. 19a. In any event, such prior art tools soon fall into disuse because of their shortcomings. Finally, dry-natured greens found in many parts of the country pose a special problem which is not sufficiently addressed. Repairing indentations in dry turf tends to separate a chunk of the green sub-surface from surrounding area instead of merely raising the affected part. The nature of some of these problems is set forth in, for example, U.S. Pat. No. 4, 179,147. Col. 1, 11. 25–35, which is incorporated herein by reference.

Prior mechanical devices found in the literature which have reportedly been used for the repair of golf ball marks include those shown in U.S. Pat. Nos. 3,168, 150; 4, 179, 147; and 3,567,264. Each of these devices is distinctly different mechanically from the claimed invention and each has limitations and disadvantages when compared to the present invention. These devices do not appear to properly or successfully repair a golf-ball indentation. As mentioned above, the proper method for repairing an indentation entails plunging prongs into the turf at an inward slant and then rotating the handle-end inward toward the indentation. This action moves adjacent soil into the indentation, properly repairing the divot without damaging the grass. Prior art devices, however, use the "wrong" method to repair a golf ball mark as shown in FIG. 19a. These devices, if at all, typically plunge prongs vertically around the indentation or cavity caused by the golf balls, and then lever the soil upwardly from below into the cavity. This action may sever the grass roots or separate the roots from the soil, resulting in troublesome brown spots on the golf course green. They fail to perform the turf repair properly, as the soil is typically displaced upward.

The Baber patent, U.S. Pat. No. 3,567,264 for example, defines a mechanically complex device which, as stated in the abstract, incorrectly repairs the turf by "forcing the earth upwardly and inwardly thereabout to raise the turf and fill the indentations." The device's claims require a "spider" mechanism for engaging and controlling the position of the prongs. From what is understood by reading the specification, it appears difficult, expensive, and impractical to manufacture, and appears prone to failure as the full force of the plunging motion is directed at numerous pivot points. This would be particularly troublesome when using the device in compacted soil, as the increased force would concentrate at a few joints, causing excessive strain and an increased likelihood of failure. The invention disclosed herein, on the other hand, properly repairs the golf-ball indentations and uses a completely distinct and novel method of engaging, positioning, and inserting turf repairing blades, and by translation and rotation, properly filling the cavities and repairing ball marks.

There is thus a long felt need in the golf industry that has not been met by the prior art. The invention disclosed herein meets these needs by providing a divot repair tool that is easily and quickly used from the standing position; simply, reliably, and sturdily constructed; and correctly repairs golf divots by duplicating the proper hand motion of the optimal repair procedure arrived at thus far in the golf course field.

SUMMARY OF THE INVENTION

The invention is directed toward the repair of golf-ball marks or indentations created on the golf-course green and more specifically the repair of a compression divot or indentation made by the force of a golf ball landing on a golf green, by displacing surrounding and compacted green into the cavity or indentation.

In a first separate aspect of the invention, the device is placed above the ball mark or area needing repair, and repair is accomplished with a single application or force.

In a second separate aspect of the invention, the device positions at least one blade adjacent to the ball mark and upon engagement of the device, the blade is plunged into the turf, forcing the turf to be displaced into the ball mark.

In a third separate aspect of the invention, the device positions at least one blade adjacent to the ball mark and upon engagement of the device, the blade is plunged into the turf. Upon further engagement, the blade pivots about a fulcrum neat the blade tip embedded in the turf, rotating about said fulcrum to reduce the inward slant and thereby displacing the golf-course turf.

In a further separate aspect of the invention, the invention allows a person to repair golf-course turf comfortably from a standing position.

In another separate aspect of the invention, the device is designed to first plunge downward and then rotate or translate inwardly or laterally to properly repair a golf-ball indentation.

BRIEF DESCRIPTIONS OF THE DRAWINGS

FIG. 9c–f show the proper sequence for each plunge of the divot repair tool.

FIG. 20a is a front view, and FIG.20b is a side view of the conventional divot repair hand tool now most commonly used.

DESCRIPTION OF THE PREFERRED EMBODIMENT

Figures 1, 2:
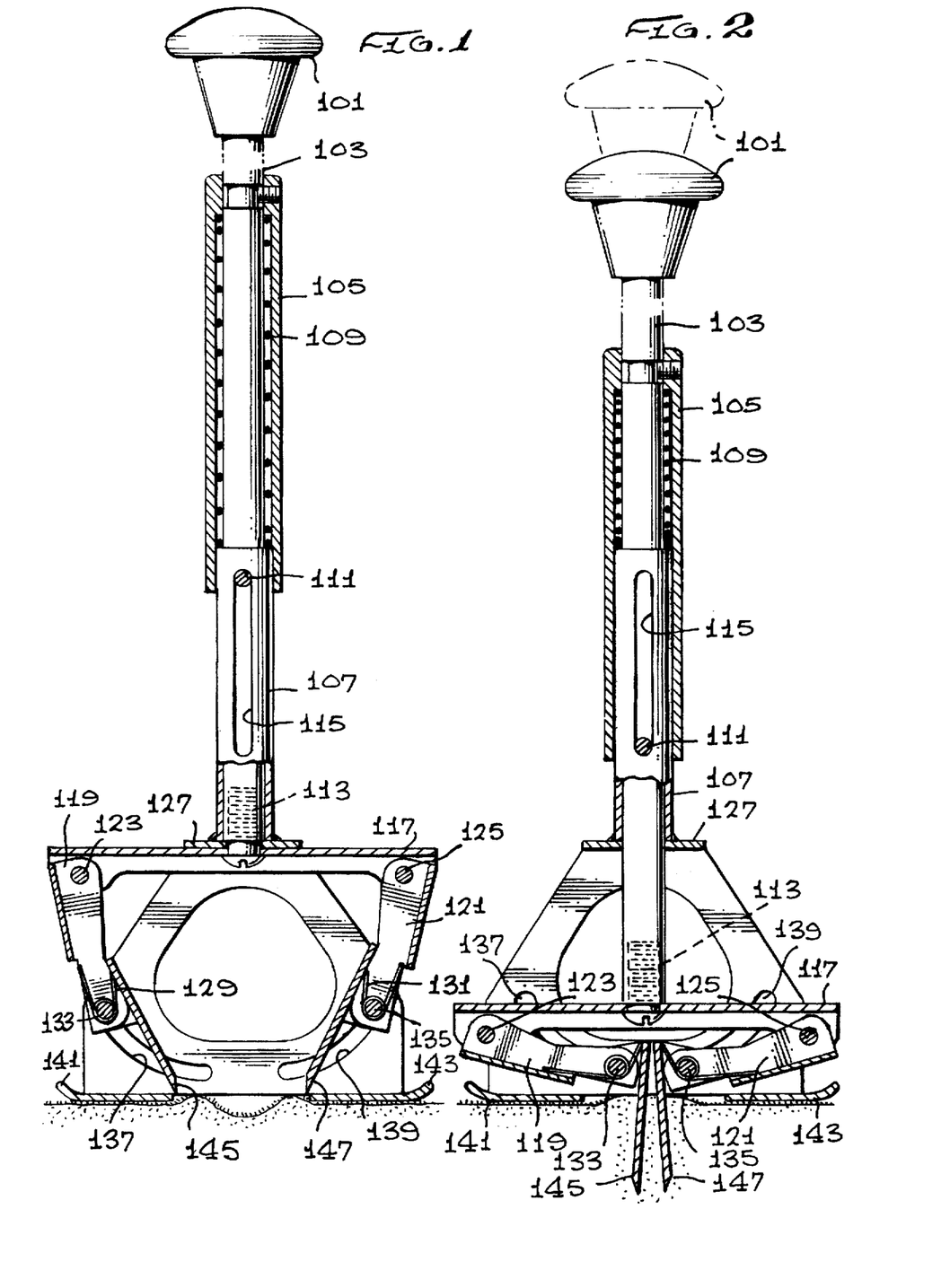
FIG. 1 is a from view with partial cross-sectioning showing the preferred embodiment of the invention in an at-rest position.
FIG. 2 is a front view with partial cross-sectioning showing the preferred embodiment of the invention in the fully engaged position.
Figure 9:
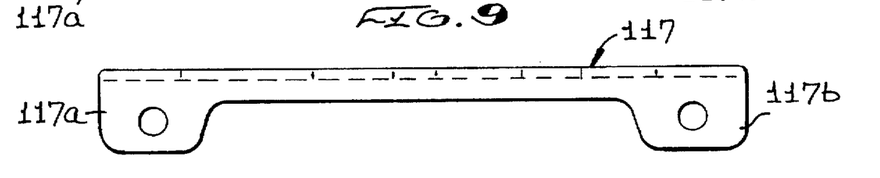
FIG. 9 is front view of the second or top member showing the flanges with holes 117a and 117b that pivotally receive the links 121 and 119.
Figure 10:
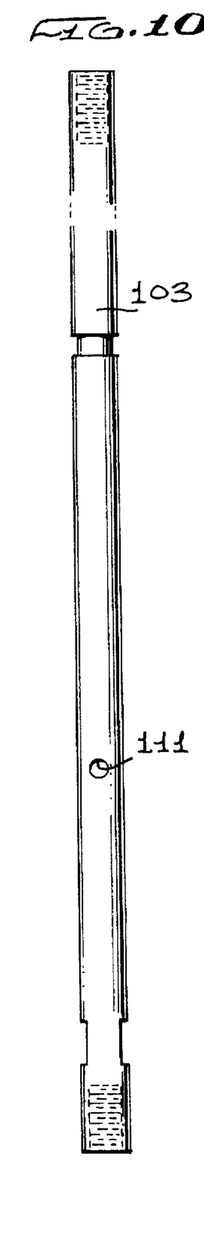
FIG. 10 is a front view of the post of the handle.

While there are many embodiments contemplated, a detailed proportional drawing of one of the best modes of the present invention is shown in FIG. 1, where the device is presented in the at-rest position before use. The device is first centered above the ball mark to be repaired. Then guide surfaces 141 and 143 are placed to rest, generally adjacent to the ball mark. These guide surfaces are described in more detail in FIGS. 6 & 7. Briefly providing an overview of the device, the guide surfaces 141 and 143 are attached to the bottom of a first member or arm attire 127 (also shown in FIG. 3). The first member or armature 127 is slidably connected to second or top member 117 which in turn is connected to a post 103. The handle includes a knob 101 attached to the top end of post 103. A more detailed view of post 103 is shown in FIG. 10. In the preferred embodiment, the bottom end of the post 103 is bolted to the second or top member 117. (Also shown in more detail in FIGS. 8 and 9.)

Figures 11, 12, 13, 14, 15:
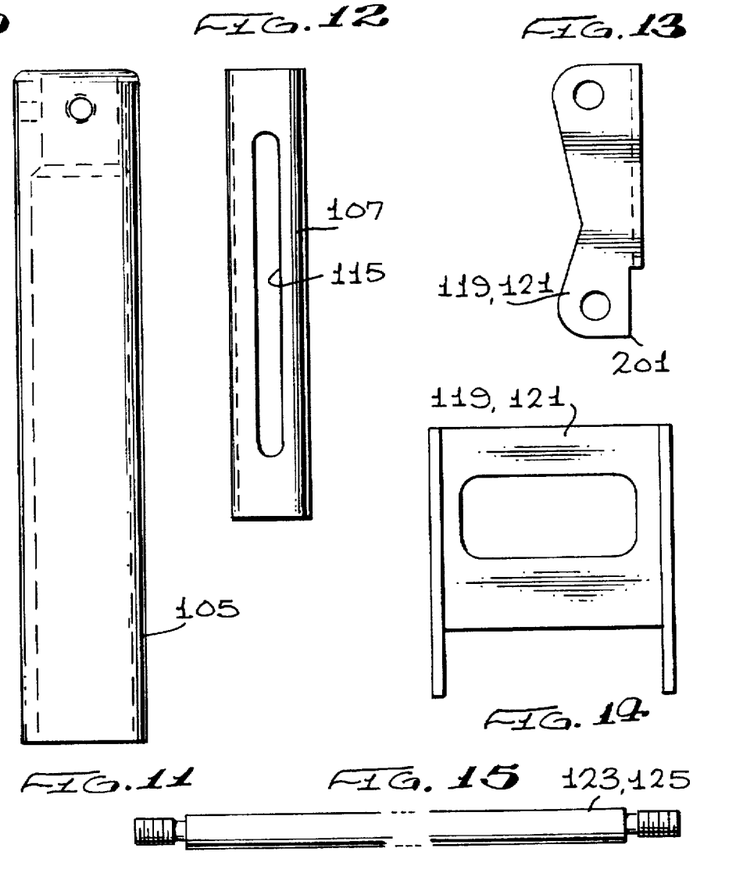
FIG. 11 is a front view of the upper sleeve of the handle.
FIG. 12 is a front view of the lower sleeve, which is welded to the first member or armature 117.
FIG. 13 is a front view of the down link.
FIG. 14 is a side view of the down link.
FIG. 15 is a side view of the top link axle 123 and 125 which pivotally connects the top or second member 117 with the down links 119 and 121.

An upper sleeve 105 is attached to the post 103, and a post spring 109 is located around the post 103 and inside the upper sleeve 105 (shown in more detail in FIG. 11.) The top end of a first link 119 and the top end of a second link 121 are attached to the second or top member 117 with a top link axle 123 and a second top link axle 125 respectively. The preferred embodiment uses two links 119 and 121, which are detailed in FIGS. 13 and 14 and two top link axles 123 and 125, which are also detailed in FIGS. 15 and 16. The links 119 and 121 are free to pivot about the top link axles 123 and 125. The bottom end of the link 119 and 121 is slidably attached to the first member or armature 127 with the lower axles 133 and 135 respectively. The preferred embodiment uses two lower axles 133 and 135, which are detailed in FIGS. 15 and 16. The lower axles 133 and 135 are free to slide in the first and second guideways 137 and 139 respectively. The guideways 137 and 139 in the preferred embodiment are curved cut-out slots. Those skilled in the art will recognize numerous alternatives to the use of slots, including but not limited to channels, wire guides, cams, slots, linkages or rollers. A first blade 145 and a second blade 147 are attached to the first and second link by lower axles 133 and 135 and torsion springs 129 and 131 respectively. The blades 145 and 147 in the preferred embodiment are detailed in FIGS. 17 and 18. In the preferred embodiment, two blades are used, with each blade having seven prongs. Of course, there are numerous alternatives to the blades. The torsion springs 129 and 131 return the blades 145 and 147 to the at-rest position biased against the guide surfaces after use of the device while allowing the blade to pivot during engagement. Although torsion springs are used to correctly position the blade angle and allow flexible movement of the blade as the blade is engaged, there are several mechanisms, including other types of springs, for performing the same function.

We have thus defined the movable portion of the best mode of the invention represented by the knob 101, the post 103, post pin 111, the upper sleeve section 105, the post spring 109, the second or top member 117, the top axles 123 and 125, the links 119 and 121, the lower axles 133 and 135, the torsion springs 129 arid 131, and the blades 145 and 147.

The movable structure defined above moves in relation to the stationary structure which is now defined. As outlined previously, the first or top member 127 has a first guideway 137 and a second guideway 139. These guideways 137 and 139 direct the path of the lower end of the links 119 and 121, the first and second lower axles 133 and 135, the first and second torsion springs 129 and 131 and blades 145 and 147. As outlined previously, a first guide surface 141 and a second guide surface 143 are attached to the base of the first member or armature 127. The first and second guide surfaces 141 and 143 are separated sufficiently to leave a space that spans the ball mark or turf area to be repaired. The guide surfaces 141 and 143 also assist in the proper alignment of the blades 145 and 147. A lower sleeve section. 107 is welded to the top of the first or top member 127. The lower sleeve 107 is sized to allow the post 103 to freely slide or telescope inside the sleeve 107 and proportioned to allow the upper sleeve section 105 to slide freely outside the sleeve 107 while restricting the post spring 109 which biases the upper and lower sleeves away from each other. The stationary structure is represented by the first or armature member 127, the guide surfaces 141 and 143, and the lower sleeve section 107.

The at-rest and fully engaged positions may be defined in two, non-exclusive ways. First, the lower sleeve section 107 contains a lower sleeve slot 115 that is sized to limit the displacement and rotation of the post as it moves vertically in the lower sleeve section 107, during the telescoping process. A post pin 111 is embedded in the post so the post pin engages the lower sleeve slot 115 at the top when in the at-rest condition and engages the bottom to the lower sleeve slot 115 when the post 103 is fully depressed, limiting its vertical motion. Second, these same positions may be defined by the mechanical constraints imposed by the second member 117 contacting the first member 127 in the at-rest position, and by the lower link axle 133 and 135 contacting the lower terminus of the guideway 137 and 139 in the fully engaged position. The inventor has found both methods for limiting vertical motion acceptable, with the latter method used in the preferred embodiment.

Figure 24:
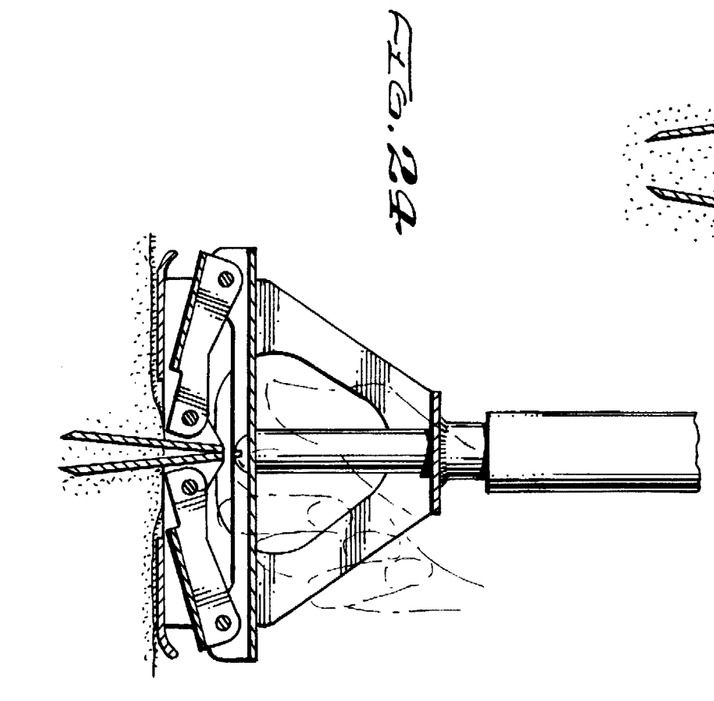

FIGS. 21 through 24 illustrate the device in operation showing the device fully at rest (FIG. 21), at two intermediate positions (FIGS. 22 and 23), and at a fully depressed position (FIG. 24). The device is operated by centering the device over the area of the turf to be repaired, and then positioning the guide surfaces 141 and 143 to approximately the outside of the ball mark or turf to be moved. The blades 145 and 147 are held at an inward angle by the link 119 and 121, the lower axles 133 and 135, the guide surfaces 141 and 143 and the torsion springs 129 and 131. With the device firmly placed on the ground, force is applied to the handle (knob 101 or post 103). The knob 101 is depressed in one continuous motion until the post pin 111 stops the downward motion of the post 103.

FIG. 2 shows the device in a fully engaged position. In the preferred embodiment, the post 103 is depressed approximately 2¼ " for full engagement. For comparison purposes, the total height of the device is approximately 28" for convenient stand-up use. Because of the already described relationship, the second or top member 117 is moved downward in sync with the displacement of the post 103. As the second or top member 117 begins to move downward, the links 119 and 121 begin to drive the blades 145 and 147 into the turf. The guideways 137 and 139 are shaped to allow the blades 145 and 147 to be driven into the turf, simulating the proper method for repairing ball marks as shown in FIGS. 19b–f; namely the plunging of the knife or blade into the turf followed by an inward rotation generally about a fulcrum near the tip of the blade followed by translation inwardly towards the hole or ball mark. As the blades 145 and 147 reach their maximum depth in the turf, the path of the lower end of the link 119 and 121 becomes more horizontal, acting to rotate the top of the blades first to a vertical position and continuing until each blade 145 and 147 is positioned in an outward slant. The force on the knob 101 is then removed and the post spring 109 and torsion springs 129 and 131 return the device to its at-rest position.

Figures 25, 26:
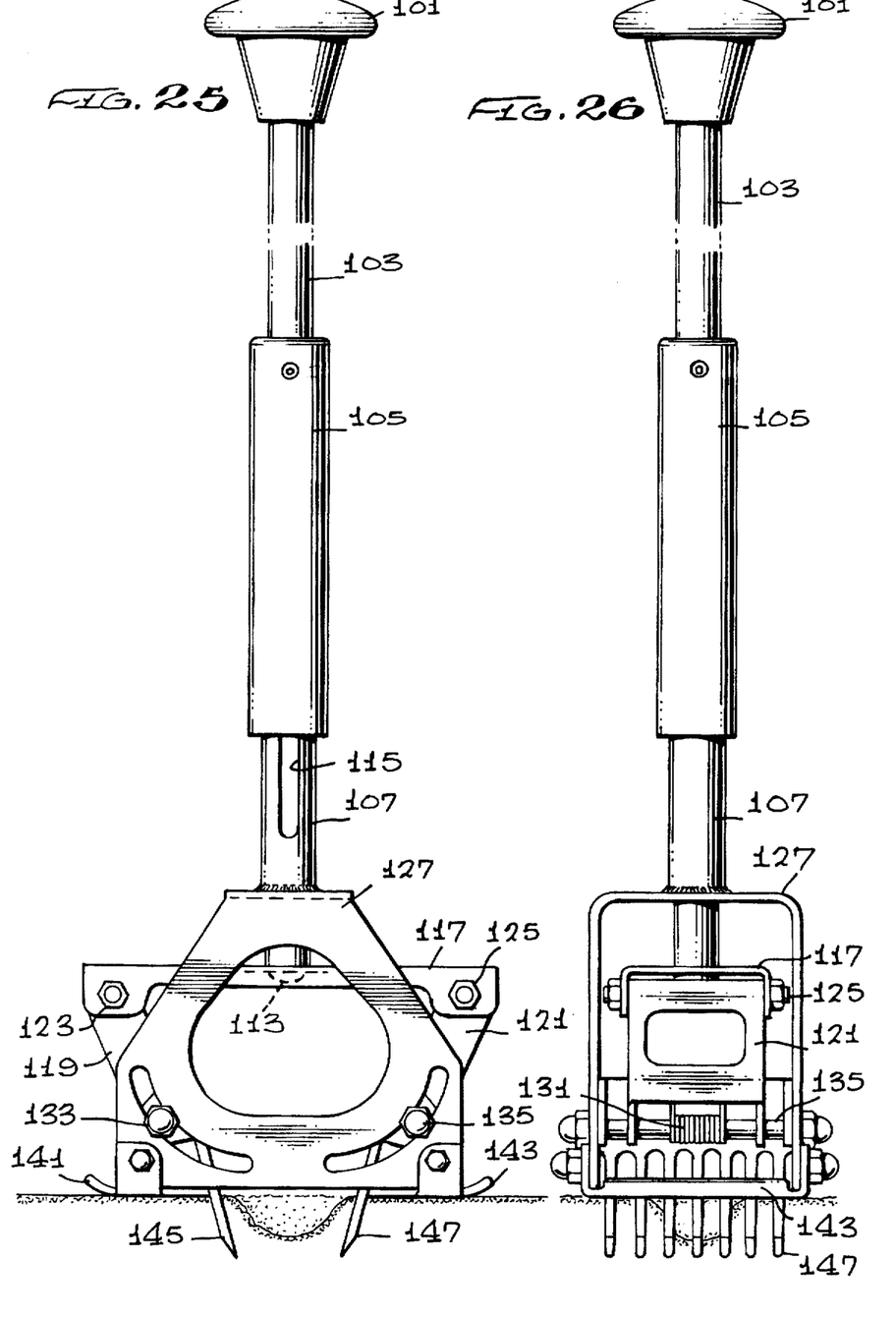
FIG. 25 is a front view of the preferred embodiment while partially engaged.
FIG. 26 is a side view of the preferred embodiment while partially engaged.

FIGS. 25 and 26 show the preferred embodiment approximately one-half engaged, with FIG. 25 showing a front view and FIG. 26 showing a side view. At this point of engagement, the blades 145 and 147 have been plunged into the turf at an inward angle and the inward tilting of the blades 145 and 147 is beginning about a fulcrum near each blade tip. Additionally, as the device is further engaged, the links 119 and 121 tilt the blades 145 and 147 inwardly, and then may cause the blades 145 and 147 to move laterally toward the indentation. Of course, as the blades 145 and 147 move laterally, the fulcrum for the inward rotation will also move. Referring again to FIG. 2, as the device becomes fully engaged, the links 119 and 121 push the blades 145 and 147 away from the guide surfaces 141 and 143 toward the center of the indentation. The amount of this lateral movement depends on the compaction of the soil, with a hard soil allowing little lateral movement, and loose soil producing more lateral movement. The inventor, through experimentation, has found the inward tilting motion, which duplicates the proper hand motion for repairing divots (see FIGS. 19b–f), combined with this lateral or transverse movement optimally repairs golf ball divots.

Figure 3:
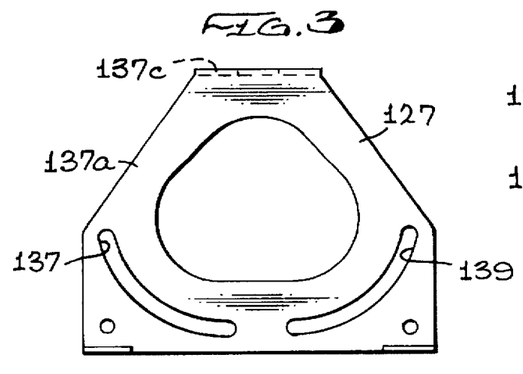
FIG. 3 is a front view of the first member or armature 117, showing the locations of the pathways or slots 137 and 139 which ultimately guide the position and rotation of the blades.
Figures 4, 6, 7, 8:
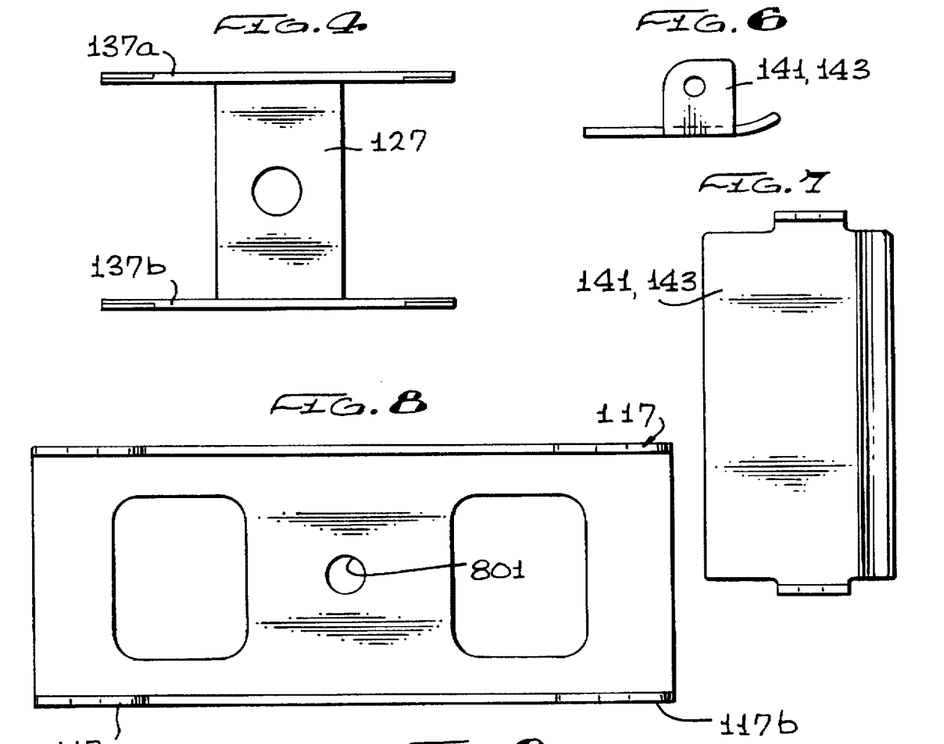
FIG. 4 is a bottom view of the first member showing that the first member is a single piece of stamped metal composed of two vertical plates 137a and 137b connected at the top by a cross member 137c. The two vertical plates have pathways or slots 137 and 139 which directly or indirectly guide the translation or rotation of the blades.
FIG. 6 is a front view of the guide surface.
FIG. 7 is a top view of the guide surface.
FIG. 8 is a top view of the second or top member.
Figure 5:
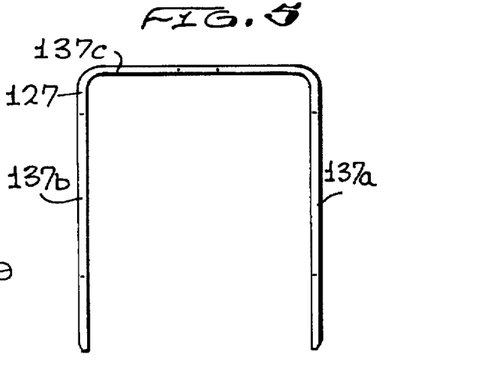
FIG. 5 is a side view of the first or guide armature member.

Proceeding now in more detail in describing each member, FIG. 3 shows a from view of the first member 127 with the guideways. The guideways 137 and 139 are symmetrical mirror images about the vertical center line of the first or top member 127, so only one guideway 139 will be completely described. The opposing side of the first member 127 has identical slots. In the preferred embodiment the guideway 139 is defined by pivoting the center point of a 0.2344" diameter cutting tool about a 1.31" radius with the center point of the radius 0.44" from the vertical center line of the first member and 1.56" from the bottom of the first member. The lower endpoint of the radius is defined as 0.25" from the bottom of the first member and 1.31" vertically below the center point of the radius. The second endpoint of the radius is defined as the point 1.38" from the bottom of the first member and 0.25" from the edge of the first member. The radius and both endpoints are all defined on one side of the vertical centerline of the first member. The first member 127 is 3.41" high and 4.00" wide. The first member 127 has cutouts on opposing sides in the shape of an equilateral triangle centered on the vertical center line with 0.75" radius rounds and with the peak of the shape 2.81" above the bottom of the first member 127. FIG. 4 shows a top view of the first member 127 with a ⅝" diameter hole in the center. The overall depth of the first member 127 is 2.50". FIG. 5 shows a side view of the first member 127. The guide surfaces 141 and 143 are detailed in FIG. 6 and FIG. 7.

FIG. 8 shows the top view of the second or top member 117. A center 0.3860 diameter hole 801 is used to allow attachment of the second member 117 with a bolt to the post 103. The 1" by 1.25" cutouts with 0.25" rounds are centered about the horizontal centerline and symmetrically placed 0.75" from the vertical center line. FIG. 9 shows the side view of the second member 117. The 0.2210" diameter holes are used to attach the first and second link 119 and 121 to the second member 117 using a first and second link axle 123 and 125.

FIG. 11 shows the upper sleeve section 105 which forms the handle portions of the invention. FIG. 10 shows the post 103. The upper sleeve section 105 has an outside diameter of ⅞", and an inner diameter of ¹¹⁄₁₆" with a ³³⁄₆₄" hole to allow the post 103 to extend out. A 0.1590" diameter hole is drilled and tapped radially 0.38" from the upper end of the upper sleeve section 105 to provide for connection to post 103 and retention of spring 109. A post pin 111 is set in post 103 extending through the lower sleeve slots 115. Additionally, the post pin 103 travels in the lower sleeve slots 115 and restricts the post 103 from rotating within the lower sleeve 107; thus keeping the moveable structure properly aligned within the stationary structure.

FIG. 12 shows the lower sleeve section 107 with the proper proportioning of the 0.1935" wide lower sleeve slots 115. The lower sleeve section 107 has an outside diameter of ⅝" with a wall thickness of 0.049" and is permanently attached at the lower end of the top of the first member 127. FIG. 13 shows the front view of the link 119 and 121 and FIG. 14 shows the side view. Referring to FIG. 13, note that corner 201 is left squared. The shape of this corner 201 affects the amount of lateral blade 145 and 147 movement as the preferred embodiment nears full engagement. Those skilled in the art will recognize that the shape of the link can be modified to adjust the specific motion of the blades 145 and 147.

Figure 16:
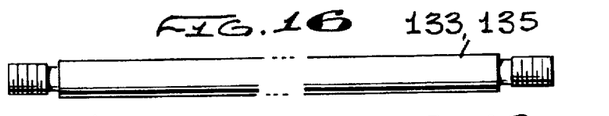
FIG. 16 is a side view of the lower axle which pivotally connects the down links 119 and 121 to the blades 145 and 147 as guided by the slots or channels 137 and 139 located on the first or guide armature member.
Figure 17:
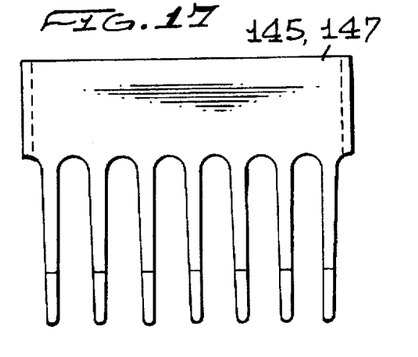
FIG. 17 is a side view of the blade which is plunged into the turf to fix the ball mark.
Figure 18:
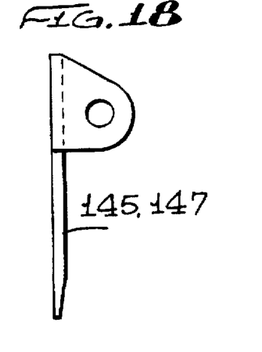
FIG. 18 is a front view of the blade which is plunged into the turf.

FIG. 15 shows the first and second link axles 123 and 125 and FIG. 16 shows the first and second frame axles 133 and 135. FIG. 17 shows the side view of the blade with FIG. 18 showing the front view.

All stamped metal pans for the preferred embodiment are from 0.090" thick corrosion-resistant stainless steel, except the guide surfaces 141 and 143 which are from 0.070" thick corrosion-resistant stainless steel. The post 103 and upper sleeve sections 105 are turned from aluminum stock, and the lower sleeve 107 is corrosion-resistant stainless steel tubing. The knob 101 is plastic. All nuts and bolts are corrosion-resistant stainless steel, and the torsion spring is made of stainless steel wire. It should be clear to those skilled in the art that there are many options and alternatives for material selection.

As described herein, the claimed device solves the ball mark problems and reduces the expense of maintaining greens. FIG. 1 illustrates the various components of the device in the "Up", at-rest, position before use and FIG. 2 shows the device in the "Down", fully-engaged, position during use. Operation is completed entirely from a standing position. The operator centers the device over the indentation, and using his or her body weight rather than muscular strength, pushes "Down" on the hand knob. Upon release of the knob, the device automatically returns to the "Up" position, and the ball mark is properly repaired, and the device is ready for application on another mark. The two members actually closing the dent are 7-prong claws active from both sides and moving turf toward the center simultaneously.

One 2¼" plunge and release does the equivalent work of at least seven insertions, manipulations, and withdrawals of the conventional hand tool. Any unevenness remaining on the turf surface from the repairing action can be smoothed out by gently tamping with the flat surfaces on the bottom of the preferred embodiment.

FIGS. 21 through 24 illustrate how the mechanics of the claimed design produces movement of the twin 7-prong claws identical to the theoretical movement of the 2-prong hand tool recommended for proper ball mark repair as shown in FIG. 19b. The unique design of the preferred embodiment permits a faster and easier method of properly repairing ball marks, which will result in lower golf course maintenance expense for golf course superintendents and more pleasure for golfers.

While embodiments and applications of this invention have been shown and described, it would be apparent to those in the field that many more modifications are possible without departing from the inventive concepts herein. The invention, therefore, is not to be restricted except in the spirit of the appended claims.

What is claimed is:

1. A divot repair device, comprising:

a first member, said first member having at least one guideway;

at least one link with a first end and a second end, the second end of said link attached to traverse in said guideway;

a second member, said second member moveable relative to said first member, said second member pivotally attached to the first end of said link;

a torsion spring, said torsion spring connected to the second end of said link;

a plurality of blades, each said blade having a proximate end and a tip end with the proximate end of said blade attached to the second end of said link whereby each said blade is positioned at an original inward slant relative to said first member with said inward slant defined as the proximate end of said blade being more distant than the tip end of said blade to the vertical centerline of said first member when said device is in an at-rest position;

whereby as said second member engages said link, said blades plunge downward in-line with said original inward slant and subsequently, said blades are engaged by said link to pivot about a fulcrum near said blade tips,thus rotating said blade to reduce said original inward slant.

2. The device of claim 1 where said blades have a plurality of prongs.

3. The device of claim 1 further comprising at least one guide surface, said guide surface attached to said first member to aid in positioning said blades into said original inward slant.

4. The device of claim 1 where said link additionally causes said blades to move laterally toward the vertical centerline of the second member with said centerline of the second member defined when said device is in an at-rest position.

5. The device of claim 1 further comprising a post, with said post attached to said second member.

6. The device of claim 1 where said plunging and said rotating of said blades is accomplished with a single continuous application of force to said second member.

7. The device of claim 1 where said device returns automatically to said original inward slant position after use.

8. The device of claim 1 where said blades are positioned symmetrically referenced to the vertical centerline of said first member when said device is in an at-rest position.

9. A divot repair device comprising:

a first member including a guide surface and a guideway, said guideway extending in a curved path first generally toward said guide surface and then generally transverse to said guide surface;

a second member slidably retained in relation to said first member;

at least one link pivotally connected relative to said second member and slidably connected with said guideway of said first member;

at least one blade pivotally mounted to said link at said guideway and biased against said guide surface of said first member.

10. A divot repair device comprising:

a first member including a guide surface and a guideway, said guideway extending in a curved path first generally toward said guide surface and then generally transverse to said guide surface;

a second member slidably retained in relation to said first member;

a link pivotally connected relative to said second member and slidably connected with said guideway of said first member.

11. A divot repair device comprising:

a first member including a guide surface and a guideway wherein said guideway extends in a curved path first generally toward said guide surface and then transverse to said guide surface;

a second member slidably retained in relation to said first member;

a blade pivotally coupled to said second member and slidably connected with said guideway.

12. A divot repair device, comprising:

a first member, said first member having at least one guideway;

a link with a first end and a second end, the second end of said link attached to traverse in said guideway;

a second member, said second member moveable relative to said first member, said second member pivotally attached to the first end of said link;

a blade, said blade having a proximate end and a tip end with the proximate end of said blade attached to the second end of said link whereby said blade is positioned at an original inward slant relative to said first member with said inward slant defined as proximate end of said blade being more distant than the tip end of said blade to the vertical centerline of said first member when said device is in an at-rest position;

whereby as said second member engages said link, the blade plunges downward in-line with said original inward slant and subsequently, said blade is engaged by said link to pivot about a fulcrum near said blade tip, thus rotating said blade to reduce said original inward slant.

13. The device of claim 12 where said blade has a plurality of prongs.

14. The device of claim 12 further comprising at least one guide surface, said guide surface attached to said first member to aid in positioning said blade into said original inward slant.

15. The device of claim 12 where said blade is rotated through a vertical position to come to rest at an outward slant.

16. The device of claim 12 further comprising a post, with said post attached to said second member.

17. The device of claim 12 where said plunging and said rotating of said blade is accomplished with a single continuous application of force to said second member.

18. The device of claim 12 where said blade additionally moves laterally toward the vertical center line of said first member.

19. The device of claim 12 where said device returns automatically to said original inward slant position after use.

20. A divot repair device, comprising:

a first member, said first member having at least one guideway where said guideway is a slot;

a link connected to said first member;

a second member, said second member capable of moving relative to said first member, said second member connected to said link;

a blade, said blade connected to said link and rotatable relative to said first member.

* * * * *